(No Model.)
C. JUSTESEN.
POST HOLE AUGER.
No. 474,664. Patented May 10, 1892.
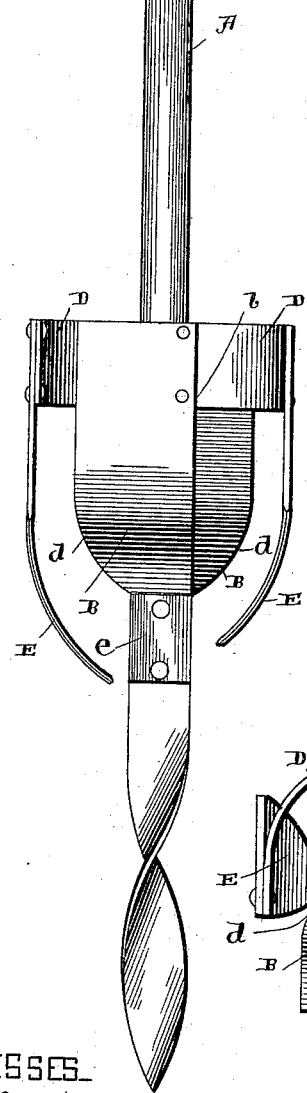
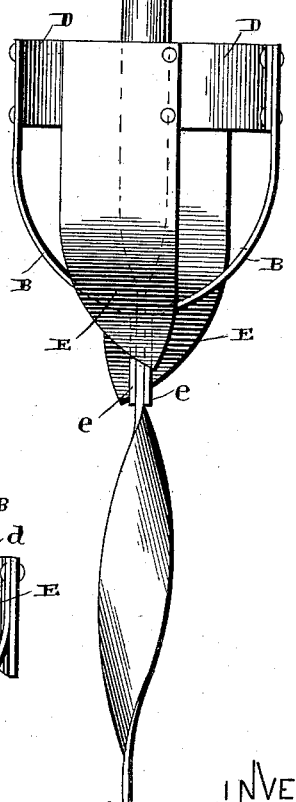

UNITED STATES PATENT OFFICE.

CHRISTEN JUSTESEN, OF AUDUBON, IOWA.

POST-HOLE AUGER.

SPECIFICATION forming part of Letters Patent No. 474,664, dated May 10, 1892.

Application filed January 20, 1892. Serial No. 418,640. (No model.)

*To all whom it may concern:*

Be it known that I, CHRISTEN JUSTESEN, of Audubon, in the county of Audubon and State of Iowa, have invented certain new and useful Improvements in Post-Hole Augers; and I do hereby declare the following to be a full, clear, and exact description of the invention, such as will enable others skilled in the art to which it pertains to make and use it, reference being had to the accompanying drawings, which form part of this specification.

My invention relates to improvements in post-hole augers; and it consists in certain novel features of construction and in the combination and arrangement of the parts, which will be fully described hereinafter, and particularly referred to in the claims.

The object of my invention is to produce a post-hole auger of the construction hereinafter shown and described, whereby holes are easily and quickly bored and the dirt cut out of the hole thrown to the inside of the auger between the blades to be raised out of the hole and the blades made and arranged as shown and described, whereby the cutting of the earth is facilitated.

In the drawings, Figure 1 is a side elevation of an auger embodying my invention. Fig. 2 is a similar view taken at right angles to Fig. 1. Fig. 3 is a plan view of an auger embodying my invention.

A indicates a vertical rod which has its lower end made flat and twisted, as shown, to form a sort of a gimlet end, and is provided just above the twisted portion with a flat portion, to which the blades B are secured. The rod A above this point is preferably made round, though it may be made of any desired form that is convenient and suitable, and has connected to its upper end in any suitable manner a handle C, by means of which the auger is operated.

The blades B have a straight-back edge $b$, a cutting-edge $d$, which has its lower end rounded inward, and projecting downward an extension $e$, which is bolted to the flat portion of the rod A, as shown, thus bringing the blades B at opposite sides of the rod at this point. Each of the blades B are curved gradually outward and upward, as shown, and have secured to the inner side of their upper ends the curved plates D. These plates D are secured to the rear or non-cutting edge of the blades B, as shown, so that their cutting-edge projects outward therefrom, as shown. Secured to the opposite ends of these supporting-plates D is a second set of cutting-blades E, which are provided with a straight rear or non-cutting edge G. The opposite edges of these blades E are sharpened to form cutting-edges, and have their lower ends rounded or curved inward to form a point, as shown. It will be noticed that one of these blades E is longer than the other intentionally, to facilitate the entering and cutting of the implement and the shorter blade E extends intentionally a little below the blades B, as shown, for the same purpose. It will also be noticed that, owing to the manner in which the blades E are supported, the dirt cut by them is thrown to the inner side of the auger, to be lifted out when it is withdrawn from the hole, and that the entire cutting-edges of the said blades are uninterrupted.

By means of the above-described construction I produce an auger which is simple and yet very effective in its work.

Having thus described the nature and object of my invention, what I claim, and desire to secure by Letters Patent, is—

1. A post-hole auger comprising a rod having a handle at its upper end, blades secured thereto at their lower ends, and blades supported by the said blades, substantially as described.

2. An earth-auger comprising a rod having a handle, blades secured at their lower ends to the said rod, supporting-plates secured to the said blades, and blades secured to the said supporting-plates, substantially as specified.

3. An earth-auger comprising a rod, blades secured at their lower ends to the said rod, supporting-plates secured to the upper ends of the said blades and extending beyond their edge, and blades secured to the projecting ends of the said supporting-plates, substantially as set forth.

4. An earth-auger comprising a rod having a handle, blades secured at their lower ends to the said rod, supporting-plates secured to the inner edges of the said blades at their non-cutting edges, for the purpose described, and blades secured at their non-cutting edges to the opposite ends of the supporting-plates, substantially as shown.

5. An earth-auger comprising an operating-rod, blades secured at their lower ends thereto, and blades supported by and having their lower ends below the cutting-edges of the said blades, substantially as specified.

6. An earth-auger comprising an operating-rod, blades supported at their lower ends thereby, and blades supported by and having their lower ends below the cutting-edges of the said blades, one of the longer blades being longer than the other, substantially as set forth.

7. An earth-auger comprising an operating-rod having its lower end twisted and pointed, blades secured at their lower ends to the said rod above the twist, and blades supported from the upper ends of the said blades and a suitable distance therefrom, substantially as described.

In testimony whereof I affix my signature in presence of two witnesses.

CHRISTEN JUSTESEN.

Witnesses:
LANST C. CHRISTENSEN,
M. B. WONSMOS.